350-96.27 SR
XR 3,467,774 6N
CROSS REFERENCE SEARCH ROOM

Sept. 16, 1969 J. F. BRYANT 3,467,774

SCANNER EMPLOYING INTERLEAVED LIGHT CONDUCTING AND LIGHT DETECTING OPTICAL FIBERS

Filed June 7, 1966

INVENTOR.
John F. Bryant,
BY
Watson, Cole, Grindle & Watson
ATTORNEYS.

United States Patent Office 3,467,774
Patented Sept. 16, 1969

3,467,774
SCANNER EMPLOYING INTERLEAVED LIGHT CONDUCTING AND LIGHT DETECTING OPTICAL FIBERS

John F. Bryant, Lemon Grove, Calif., assignor to Stromberg-Carlson Corporation, Rochester, N.Y., a corporation of Delaware Filed June 7, 1966, Ser. No. 555,812
Int. Cl. H04n 5/38
U.S. Cl. 178—7.2 3 Claims

ABSTRACT OF THE DISCLOSURE

A flying spot scanner employs a cathode ray tube as a light source to scan one end of a set of fibers interleaved at the other end to contact the plane of a pattern or message sheet with alternating fibers coupled to a photo detector device to provide video signals dependent upon the reflectivity of the pattern at the instantaneous positions being scanned.

Figures 1, 2:
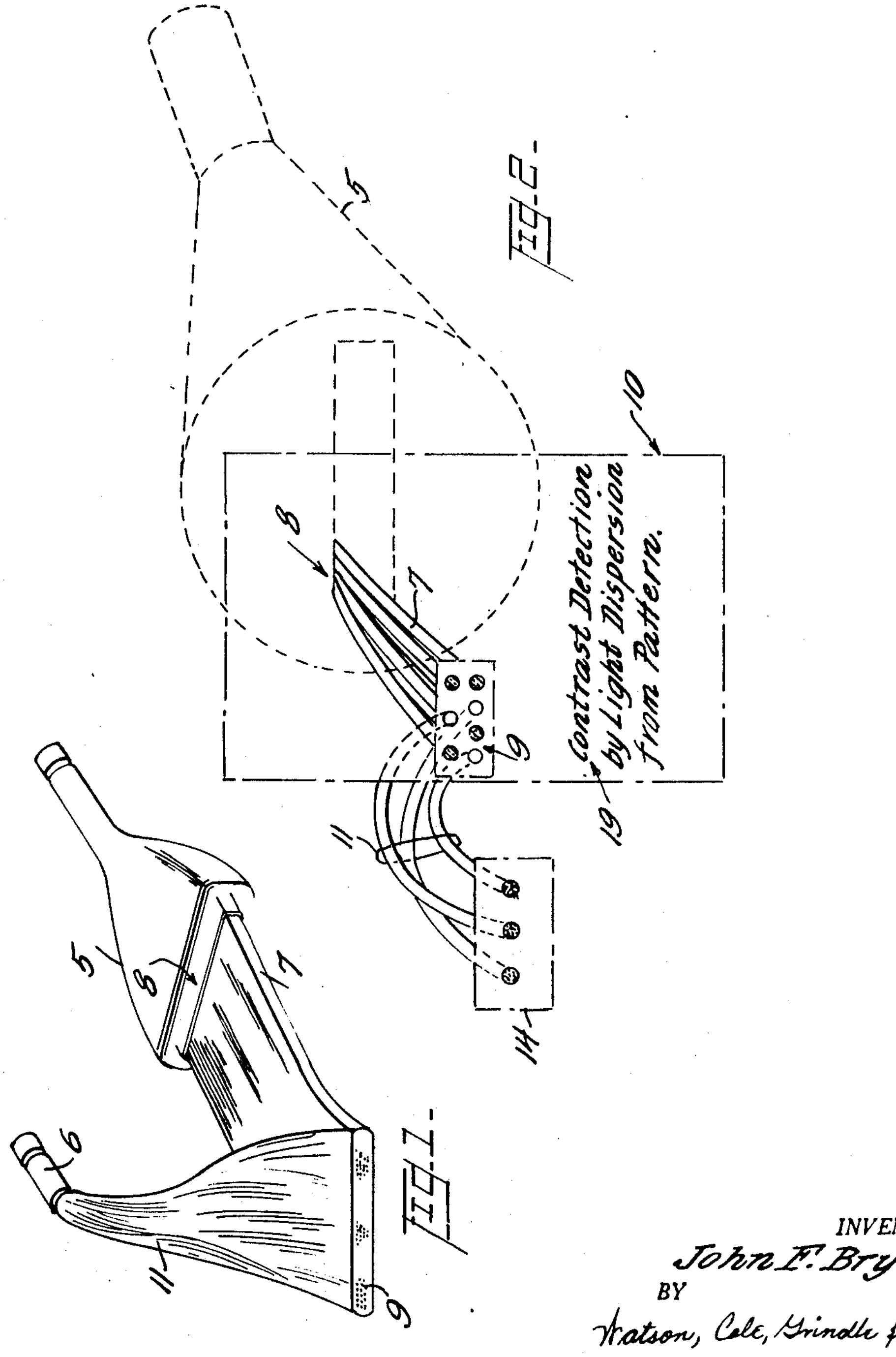

This invention relates to scanning systems for producing electrical video signals from visible objects such as printed text or pictures and, more particularly, it relates to flying spot scanners employing cathode ray tubes for scanning the objects with a light beam over a pattern defined by deflection of the cathode ray beam.

In a co-pending application of the common assignee entitled "Flying Spot Scanner Employing Fiber Optics," Ser. No. 555,845, filed June 7, 1966 by B. L. McGlamery, a system is proposed for reproducing video signals with light diffused or dispersed from a visible object such as an opaque printed sheet.

It is an object of the present invention to provide an improved and more efficient flying spot scanner of this type.

Therefore, in accordance with this invention, a fiber optic array is employed to conduct efficiently light dispersed from a flying spot as it scans the visible object to a photo-responsive video detector. A flying spot scanner thus utilizes a cathode ray tube with a fiber optic faceplace terminating in the visible object reading plane, where a further bundle of fibers are interleaved at the visible object plane with a further set of fibers conveying dispersed light from the object to the video detector.

The various features of the invention and details of operation are defined with particularity in the following specification with reference to the accompanying drawing, wherein:

FIGURE 1 is a perspective view of scanning apparatus provided in accordance with this invention, and FIGURE 2 is a partial view in enlarged scale showing relationships and construction of the optical fibers as employed in this invention.

A scanning system employing the scanner structure of this invention provides for scanning a transparency or opaque picture or text bearing member with a deflected light spot generated by a cathode ray tube and deriving a video signal representative of the instantaneous reflective or dispersive character of the member at the spot position by picking up light diffused back from the member. Such a system is described in more detail in the above mentioned co-pending application, which is incorporated by reference as a part of the present specification to amplify the teachings set forth herein in providing a system environment for the specific scanner structure disclosed herein.

With respect to the specific scanner assembly of this invention reference may be made to both FIGURES 1 and 2 for understanding the principles of operation and manner of construction. The flying spot scanner tube 5 has a conventional deflection and scanning system with which a instantaneous video signal developed at photo detection device 6 is correlated. The scanner tube 5 has a fiber optic faceplate 7 extending from the inner phosphor surface 8 of the cathode ray tube 5 to the object reading plane 9 which is juxtapositioned at a pattern bearing member such as sheet 10. This pattern member might be a photo print or transparency, which has printing 19 or some other visible intelligence appearing thereon in such form that a contrasting reflective or diffusing surface proportional to the degree of visibility of the pattern is presented to light impinging thereon. Such incident light is generated by the electron beam of the scanner tube 5 as it strikes the inner phosphor surface 8. This deflected and moving light spot then is transmitted by way of the optical fiber bundle 7 to a corresponding scanning pattern on the sheet 10 at the reading plane 9.

In fiber bundle 7 the fibers are preferably a coherent array of parallel fibers shown in exaggerated size by the hatched circles in FIGURE 2. This permits a one to one relationship between the deflection of the beam in scanner tube 5 and the position of the interrogated spot in sheet 10 as desired in flying spot scanner operation, for reproducing instantaneous video signals for an electronic printer, television system, or the like. The fibers are actually small enough, such as .001" in diameter, to give good definition for reproducing printed text or legible pictures.

In accordance with this invention a further bundle of optic fibers 11 has ends interspersed between ends of fibers in bundle 7 at the reading plane 9, as represented in FIGURE 2 by the unhatched circles. These fibers lead to a photocell viewing plane 14 at which the ends are presented in an incoherent array, preferably with their terminal ends non-polished or roughened (as indicated by the stippled ends shown) to diffuse light transmitted from plane 9 and emanating from the ends of the fibers of bundle 11 at the photocell viewing plane or surface 14. The incoherent array is established by jumbling fibers into a random presentation at plane 14. Thus, both the orientation and the non-polished surface tends to distribute light flux over the active surface of photodetector 6 and reduce any effect of position sensitivity or non-uniformity of response at different portions of the photocathode or other photo-sensitive surface being used to view the light passing through fiber optic bundle 11.

The video signal generated in the photo-sensitive device 6 will result because the surface of the sheet 10 being scanned by the moving light spot leaving the ends of the fibers in bundle 7 will serve to diffuse or reflect a portion of this light back into the fibers of bundle 11 depending upon the visible intelligence presented at that spot. For example, the sheet surface may have a black absorptive surface and a contrasting white reflective surface, or it may have a silvered mirror surface and a contrasting transparent transmission surface. It has been found that ordinary printed surfaces such as newsprint will produce at the viewing plane 14 instantaneous video signals representative of the intelligence at the position of the moving light spot. By use of the incoherent fiber optic array 11 the video signals are much more efficiently produced at the photodetection surface 14, and are less sensitive to noise signals generated by variations in the photo-sensitive detector surface positions. Accordingly, an improved scanner is provided by this invention which is defined in particularity in the appended claims, believed representative of the spirit and scope of the invention.

What is claimed is:

1. In a flying spot scanner employing a scanning system with a cathode ray scanning tube having a fiber optic faceplate juxtapositioned in an object reading plane, the improvement comprising in combination, light detector means, a bundle of light conductive optical fibers having one end interleaved with the fibers of said faceplate at the object reading plane and terminating at the other end at a position providing incident light to said light detector means.

2. The improvement defined in claim 1 wherein the fibers terminating at said position providing incident light to the detector means form an incoherent array.

3. The improvement defined in claim 1 wherein the fibers terminating at said position providing incident light to the detector means have a light diffusing at these terminal ends.

References Cited

UNITED STATES PATENTS

| | | | |
|---|---|---|---|
| 3,125,013 | 3/1964 | Herrick et al. | 95—75 |
| 3,150,356 | 9/1964 | Newman | 340—174 |
| 3,215,773 | 11/1965 | Chatten et al. | 178—6.8 |
| 3,255,357 | 6/1966 | Kapany et al. | 250—227 |

OTHER REFERENCES

IBM Technical Disclosure Bulletin, vol. 5, No. 7, pp. 66–67, December 1962.

IBM Technical Disclosure Bulletin, vol. 8, No. 6, pp. 879–880, November 1965.

RALPH D. BLAKESLEE, Primary Examiner

R. K. ECKERT, Jr., Assistant Examiner

U.S. Cl. X.R.

178—7.85; 250—227; 350—96